US010746278B2

(12) United States Patent
Wakui

(10) Patent No.: US 10,746,278 B2
(45) Date of Patent: Aug. 18, 2020

(54) SUPPORT STRUCTURE OF POWER SYSTEM

(71) Applicant: HONDA MOTOR CO., LTD., Tokyo (JP)

(72) Inventor: Shigeharu Wakui, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 188 days.

(21) Appl. No.: 15/968,006

(22) Filed: May 1, 2018

(65) Prior Publication Data
US 2018/0363755 A1  Dec. 20, 2018

(30) Foreign Application Priority Data

Jun. 19, 2017 (JP) .................................. 2017-119798

(51) Int. Cl.
*F16H 57/025* (2012.01)
*B60K 1/00* (2006.01)
(Continued)

(52) U.S. Cl.
CPC ............. *F16H 57/025* (2013.01); *B60K 1/00* (2013.01); *F16H 48/08* (2013.01); *B60K 17/165* (2013.01);
(Continued)

(58) Field of Classification Search
CPC ......... F16D 63/006; F16H 63/34–3483; F16H 57/02–039; B60T 1/005; B60T 1/062;
(Continued)

(56) References Cited

U.S. PATENT DOCUMENTS 5,443,130 A * 8/1995 Tanaka .................... B60K 1/00
180/65.6
5,807,205 A * 9/1998 Odaka ...................... B60L 7/00
477/20
(Continued)

FOREIGN PATENT DOCUMENTS

CN  102371882 A  3/2012
CN  102741079 A  10/2012
(Continued)

OTHER PUBLICATIONS

Nov. 27, 2018, Japanese Office Action issued for related JP Application No. 2017-119798.
(Continued)

*Primary Examiner* — David R Morris
*Assistant Examiner* — James J Taylor, II
(74) *Attorney, Agent, or Firm* — Paratus Law Group, PLLC

(57) ABSTRACT

In a support structure of a power system, the power system includes: an electrical motor; a transmission; and a housing supported by a frame member of the vehicle via a mount arm. The transmission includes a first planetary mechanism having first to third rotating elements, the electrical motor is connected to the first rotating element of the first planetary mechanism, the left and right wheels are connected to the second rotating element of the first planetary mechanism, and the housing is connected to the third rotating element of the first planetary mechanism. A fastening member that fastens the housing and the mount arm is disposed so as to overlap in the axial direction with a connecting portion that connects the third rotating element of the first planetary mechanism and the housing.

7 Claims, 3 Drawing Sheets

(51) Int. Cl.
*F16H 57/02* (2012.01)
*F16H 63/34* (2006.01)
*B62D 21/11* (2006.01)
*B60K 17/16* (2006.01)
*F16H 48/08* (2006.01)

(52) U.S. Cl.
CPC ..... *B60K 2001/001* (2013.01); *B60Y 2200/91* (2013.01); *B60Y 2200/92* (2013.01); *B60Y 2300/18141* (2013.01); *B60Y 2400/73* (2013.01); *B62D 21/11* (2013.01); *F16H 63/3425* (2013.01); *F16H 2057/02034* (2013.01); *F16H 2057/02052* (2013.01)

(58) Field of Classification Search
CPC .... B62D 25/08; B62D 25/082; B62D 25/085; B62D 21/11; B62D 21/09
See application file for complete search history.

(56) References Cited

U.S. PATENT DOCUMENTS

| | | | | |
|---|---|---|---|---|
| 7,886,861 | B2* | 2/2011 | Nozaki | B60K 1/00 180/232 |
| 8,596,403 | B2* | 12/2013 | Cunningham | B60K 1/00 180/291 |
| 2008/0078603 | A1 | 4/2008 | Taji et al. | |
| 2012/0031691 | A1 | 2/2012 | Fuechtner et al. | |
| 2012/0295750 | A1 | 11/2012 | Fickel et al. | |
| 2013/0274052 | A1 | 10/2013 | Kalmbach et al. | |
| 2013/0297133 | A1 | 11/2013 | Hasegawa | |
| 2014/0311842 | A1* | 10/2014 | Kambayashi | B60K 1/00 188/371 |
| 2016/0201762 | A1* | 7/2016 | Chen | H02K 7/10 74/325 |
| 2018/0076687 | A1* | 3/2018 | Pritchard | H02K 11/33 |

FOREIGN PATENT DOCUMENTS

| | | |
|---|---|---|
| CN | 105751880 A | 7/2016 |
| DE | 19606771 A1 | 8/1997 |
| JP | H06-087333 A | 3/1994 |
| JP | 2008-081010 A | 4/2008 |
| JP | 2009-121638 A | 6/2009 |
| JP | 2013-112181 A | 6/2013 |
| JP | 2013-148124 A | 8/2013 |
| WO | WO 2012/164662 A1 | 12/2012 |

OTHER PUBLICATIONS

May 11, 2020, Chinese Office Action issued for related CN application No. 201810486298.X.

* cited by examiner

SUPPORT STRUCTURE OF POWER SYSTEM

CROSS-REFERENCE TO RELATED APPLICATION(S)

This application claims priority from Japanese Patent Application No. 2017-119798 filed on Jun. 19, 2017, the entire contents of which are incorporated herein by reference.

FIELD

The present invention relates to a support structure of a power system provided in an electrical motor vehicle.

BACKGROUND

A power system is known which includes an electrical motor for driving a left wheel and a right wheel of a vehicle, a transmission that is disposed on a power transmission path between the electrical motor and the left and right wheels, and a housing accommodating the electrical motor and the transmission. This type of power system is provided in an electrical motor vehicle such as a hybrid vehicle or an electrical vehicle, as a front wheel drive system or a rear wheel drive system, and the housing of the power system is generally supported by a frame member of the electrical motor vehicle via mount arms (for example, see JP-A-2008-81010 and JP-A-2013-112181).

In this type of power system, however, when the distance between a torque reaction acting position of the housing and a mount arm attaching position is great, a large moment is generated at the mount arm attaching position, and thus there is a possibility that a stable support becomes difficult. Therefore, in the power system according to the related art, the above problem is solved by increasing rigidity of the housing, but when the rigidity of the housing is increased, the weight and manufacturing costs of the power system increase, and thus there is room for improvement.

SUMMARY

The present invention is to provide a support structure of a power system capable of making a stable support while suppressing an increase in manufacturing cost.

The invention provides following Aspects (1) to (7).

(1) A support structure of a power system (e.g., a power system 1 in an embodiment, the power system including:

an electrical motor (e.g., an electrical motor 2 in an embodiment) that drives a left wheel (e.g., a left wheel 13L in an embodiment) and a right wheel (e.g., a right wheel 13R in an embodiment) of a vehicle (e.g., an electrical motor vehicle 10 in an embodiment);

a transmission (e.g., a transmission 5 in an embodiment) that is disposed next to the electrical motor in an axial direction on a power transmission path between the electrical motor and the left and right wheels; and a housing (e.g., a housing 4 in an embodiment) that accommodates the electrical motor and the transmission, wherein the housing is supported by a frame member (e.g., a frame member 11 in an embodiment) of the vehicle via a mount arm (e.g., mount arms 12A and 12B in an embodiment), the transmission includes a first planetary mechanism (e.g., a first planetary mechanism 51 in an embodiment) having first to third rotating elements (e.g., a sun gear S1, a carrier C1, and a ring gear R1 in an embodiment), the electrical motor is connected to the first rotating element of the first planetary mechanism, the left and right wheels are connected to the second rotating element of the first planetary mechanism, the housing is connected to the third rotating element of the first planetary mechanism, and a fastening member (e.g., fastening members 14 in an embodiment) that fastens the housing and the mount arm is disposed so as to overlap in the axial direction with a connecting portion (e.g., a connecting portion J in an embodiment) that connects the third rotating element of the first planetary mechanism and the housing.

(2) The support structure of the power system according to (1), wherein the housing includes: a main casing (e.g., a main casing 41 in an embodiment) that accommodates the transmission; and an electrical motor cover (e.g., an electrical motor cover 42 in an embodiment) that accommodates the electrical motor, and the main casing has higher rigidity than the electrical motor cover.

(3) The support structure of the power system according to (2), wherein the power system further includes a differential device (e.g., a differential device 6 in an embodiment) that is disposed coaxially on a side opposite to the electrical motor with the transmission interposed therebetween, the differential device being connected to the second rotating element of the first planetary mechanism and distributing output rotation decelerated by the transmission to the left and right wheels, the housing includes: the main casing that accommodates the transmission; the electrical motor cover that accommodates the electrical motor; and a differential device cover (e.g., a differential device cover 43 in an embodiment) that accommodates the differential device, and the main casing has higher rigidity than the electrical motor cover and the differential device cover.

(4) The support structure of the power system according to (3), wherein the transmission further includes a second planetary mechanism (e.g., a second planetary mechanism 52 in an embodiment) including first to third rotating elements (e.g., a sun gear S2, a carrier C2, and a ring gear R2 in an embodiment) coaxially with the first planetary mechanism, a rotation regulating mechanism (e.g., a parking brake mechanism 53 in an embodiment) that is switchable between an operating state and a non-operating state, the rotation regulating mechanism regulating a rotation of a rotating element in the operating state and allowing the rotation of the rotating element in the non-operating state, the electrical motor is connected to the first rotating element of the second planetary mechanism, the first rotating element of the first planetary mechanism is connected to the second rotating element of the second planetary mechanism, the main casing of the housing is connected to the third rotating element of the second planetary mechanism, the differential device is connected to the second rotating element of the first planetary mechanism, the main casing of the housing is connected to the third rotating element of the first planetary mechanism, the rotation regulating mechanism is connected to the second rotating element of the second planetary mechanism and the first rotating element of the first planetary mechanism which are connected to each other, and the rotation regulating mechanism is supported by the main casing of the housing.

(5) The support structure of the power system according to (4), wherein the first rotating element of the second planetary mechanism is a sun rotating body (e.g., a sun gear S2 in an embodiment), the second rotating element of the second planetary mechanism is a carrier rotating body (e.g., a carrier C2 in an embodiment), the third rotating element of the second planetary mechanism is a ring rotating body (e.g., a ring gear R2 in an embodiment), the first rotating element of the first planetary mechanism is a sun rotating body (e.g., a sun gear S1 in an embodiment), the second rotating element of the first planetary mechanism is a carrier rotating body (e.g., a carrier C1 in an embodiment), and the third rotating element of the first planetary mechanism is a ring rotating body (e.g., a ring gear R1 in an embodiment), (6) The support structure of the power system according to (4), wherein the first rotating element of the second planetary mechanism is a sun rotating body (e.g., a sun gear S2 in an embodiment), the second rotating element of the second planetary mechanism is a ring rotating body (e.g., a ring gear R2 in an embodiment), the third rotating element of the second planetary mechanism is a carrier rotating body (e.g., a carrier C2 in an embodiment), the first rotating element of the first planetary mechanism is a sun rotating body (e.g., a sun gear S1 in an embodiment), the second rotating element of the first planetary mechanism is a ring rotating body (e.g., a ring gear R1 in an embodiment), and the third rotating element of the first planetary mechanism is a carrier rotating body (e.g., a carrier C1 in an embodiment).

(7) The support structure of the power system according to any one of (4) to (6), wherein the electrical motor includes: a stator (e.g., a stator 21 in an embodiment) that is supported by the housing; and a rotor (e.g., a rotor 22 in an embodiment) that is disposed rotatably on an inner peripheral side of the stator, a rotor shaft (e.g., a rotor shaft 23 in an embodiment) is coupled to an inner peripheral part of the rotor to surround an outer periphery of one axle (e.g., a left axle 3L in an embodiment), the rotor shaft being connected to the first rotating element of the second planetary mechanism, and the rotor shaft is supported by the housing coaxially with the one axle and relatively rotatable to the one axel.

According to Aspect (1), the fastening member that fastens the housing and the mount arm is disposed so as to overlap in the axial direction with the connecting portion that connects the third rotating element of the first planetary mechanism and the housing. That is, since the housing accommodating the electrical motor and the transmission is supported, in the vicinity of the connecting portion connecting the housing and the third rotating element of the first planetary mechanism that serves as a fixed point of three rotating elements and has the largest torque reaction of the transmission, by the frame member of the vehicle, it is possible to stably support the power system without increasing manufacturing costs in particular.

According to Aspect (2), the main casing that is an accommodation casing of the transmission including the third rotating element of the first planetary mechanism that serves as a fixed point of three rotating elements and has the largest torque reaction of the transmission, has high rigidity. Thus it is possible to stably support the power system even when the rigidity of the electrical motor cover accommodating the electrical motor is lowered, and to reduce the weight and manufacturing costs of the power system by the decrease in rigidity of the electrical motor cover.

According to Aspect (3), the main casing is an accommodation casing of the transmission including the third rotating element of the first planetary mechanism that serves as a fixed point of three rotating elements and has the largest torque reaction of the transmission, has high rigidity. Thus it is possible to stably support the power system even when the rigidity of the electrical motor cover accommodating the electrical motor and the differential device cover accommodating the differential device are lowered, and to reduce the weight and manufacturing costs of the power system by the decrease in rigidity of the electrical motor cover and the differential device cover.

According to Aspect (4), since the rotation regulating mechanism is connected to the second rotating element of the second planetary mechanism and the first rotating element of the first planetary mechanism which are connected to each other, when the vehicle is stopped, the rotation of the left and right wheels can be regulated by the operation of one rotation regulating mechanism and the vehicle can be restrained. Further, since the rotation regulating mechanism is supported by the main casing having high rigidity and is disposed near the mount arm, the rotation regulating mechanism can be stably supported.

According to Aspect (5), among three rotating elements in each of the first planetary mechanism and the second planetary mechanism, the ring rotating bodies located at the outermost peripheral part are supported by the main casing of the housing, whereby the transmission can be simplified.

According to Aspect (6), since the carrier rotating bodies of both the first planetary mechanism and the second planetary mechanism are supported by the main casing of the housing, it is possible to make the first planetary mechanism and the second planetary mechanism 52 common.

According to Aspect (7), since the rotor shaft of the electrical motor is supported by the housing so as to be relatively rotatable coaxially with one axle, the size in the radial direction can be made smaller compared with a case where the rotor shaft of the electrical motor and the axle are disposed in an offset manner, and the size of the power system can be reduced.

DETAILED DESCRIPTION

Figure 1:
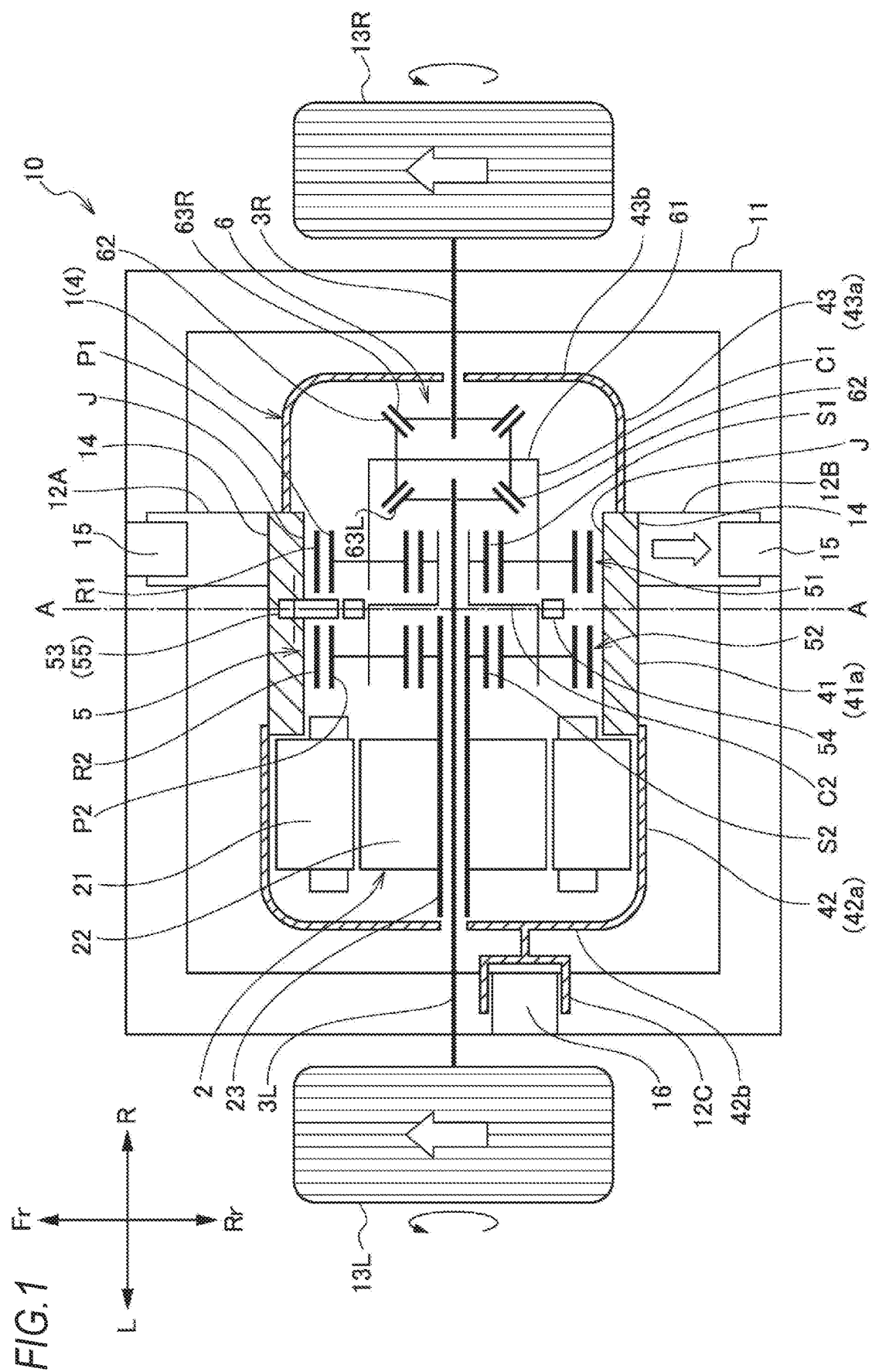
FIG. 1 is a plan view illustrating a support structure of a power system according to a first embodiment of the present invention.

Hereinafter, a power system 1 and a support structure thereof according to an embodiment of the present invention will be described by reference to FIGS. 1 to 3. The drawings should be seen in a direction in which given reference numerals look normal. In the following description, the front, rear, left, right, up and down sides of the vehicle are denoted by Fr, Rr, L, R, U and D, respectively.

The power system 1 of the embodiment includes an electric motor 2 that is a drive source for driving axles, and is provided in an electric motor vehicle such as a hybrid vehicle or an electric vehicle as a front wheel drive system or a rear wheel drive system.

First Embodiment

As illustrated in FIG. 1, an electrical motor vehicle 10 includes a rectangular frame member 11, a power system 1 supported inside the frame member 11 via a plurality of mount arms 12A, 12B, and 12C, and a left wheel 13L and a right wheel 13R driven by the power system 1.

Power System

In FIG. 1, reference numerals 3L and 3R indicate left and right axles, which are coaxially disposed in a vehicle width direction. In the power system 1, a housing 4 has the entire shape formed into a substantially cylindrical shape, and includes therein the electrical motor 2 for driving the axles, a transmission 5 that is disposed coaxially with the electrical motor 2, and a differential device 6 that is disposed coaxially on a side opposite to the electrical motor 2 with the transmission interposed therebetween and distributes output rotation of the transmission 5 to the left and right axles 3L and 3R.

Housing

The housing 4 includes a main casing 41 that accommodates the transmission 5, an electrical motor cover 42 that accommodates the electrical motor 2, and a differential device cover 43 that accommodates the differential device 6. The main casing 41 includes a cylindrical portion 41a for supporting the transmission 5. In addition, the electrical motor cover 42 includes a cylindrical portion 42a extending from one axial end of the main casing 41 (cylindrical portion 41a) in one axial direction to support a stator 21 of the electrical motor 2 and a sidewall portion 42b extending from one axial end of the cylindrical portion 42a toward an axial center to cover one side of the electrical motor 2. Further, the differential device cover 43 includes a cylindrical portion 43a extending from the other axial end of the main casing 41 (cylindrical portion 41a) in the other axial direction to cover an outer peripheral side of the differential device 6 and a sidewall portion 43b extending from the other axial end of the cylindrical portion 43a toward the axial center to cover the other side of the differential device 6.

The main casing 41 is set to have higher rigidity than the electrical motor cover 42 and the differential device cover 43. For example, the main casing 41, which is set to have high rigidity, is set to be made of a metal material and to have a thick thickness. On the other hand, the electrical motor cover 42 and the differential device cover 43, which are set to be lower in rigidity than the main casing 41, can also be made of a resin material which is lightweight compared with the metal material, and can be made thinner and lighter compared with the main casing 41 when being made of the metal material.

Electrical Motor

The electrical motor 2 includes a stator 21 fixed to an inner peripheral part of the electrical motor cover 42 (cylindrical portion 42a) and a rotor 22 disposed rotatably on an inner peripheral side of the stator 21. A hollow rotor shaft 23 is coupled to an inner peripheral part of the rotor 22 so as to surround an outer periphery of the left axle 3L, and the rotor shaft 23 is supported by the housing 4 through bearings (not illustrated) so as to be relatively rotatable coaxially with the left axle 3L.

Transmission

The transmission 5 is disposed on a power transmission path between the electrical motor 2 and the differential device 6, and includes a first planetary mechanism 51 and a second planetary mechanism 52 that decelerates driving rotation of the electrical motor 2, and a parking brake mechanism 53 that becomes an operation state at the time of parking and regulates rotation of a rotating element included in the first planetary mechanism 51 and the second planetary mechanism 52. The first planetary mechanism 51 and the second planetary mechanism 52 are connected in series to each other on the power transmission path between the electrical motor 2 and the differential device 6, the first planetary mechanism 51 is disposed on a downstream side (the differential device 6) in a driving rotation transmission direction of the electrical motor 2, and the second planetary mechanism 52 is disposed on an upstream side (the electrical motor 2). The transmission 5 of the present embodiment includes two planetary mechanisms 51 and 52, but the number of the planetary mechanisms may be one, or three or more.

First Planetary Mechanism

The first planetary mechanism 51 includes a sun gear S1 connected to the rotor shaft 23 of the electrical motor 2 via the second planetary mechanism 52, a ring gear R1 connected (fixed) to the inner peripheral part of the housing 4 (main casing 41) in a rotation regulation state, a plurality of pinion gears P1 that mesh with the sun gear S1 and the ring gear R1, and a carrier C1 that supports the plurality of pinion gears P1 to be rotatable and revolvable and is connected to a differential pinion shaft 61 of the differential device 6. When the driving rotation of the electrical motor 2 is input to the sun gear S1 of the first planetary mechanism 51 through the second planetary mechanism 52, the driving rotation decelerated through the pinion gear P1 and the carrier C1 is output to the differential pinion shaft 61 of the differential device 6.

Second Planetary Mechanism

The second planetary mechanism 52 includes a sun gear S2 connected to the rotor shaft 23 of the electrical motor 2, a ring gear R2 connected (fixed) to the inner peripheral part of the housing 4 (main casing 41) in a rotation regulation state, a plurality of pinion gears P2 that mesh with the sun gear S2 and the ring gear R2, and a carrier C2 that supports the plurality of pinion gears P2 to be rotatable and revolvable and is connected to the sun gear S1 of the first planetary mechanism 51. When the driving rotation of the electrical motor 2 is input to the sun gear S2 of the second planetary mechanism 52, the driving rotation decelerated through the pinion gear P2 and the carrier C2 is output to the sun gear S1 of the first planetary mechanism 51.

Parking Brake Mechanism

Figure 2:
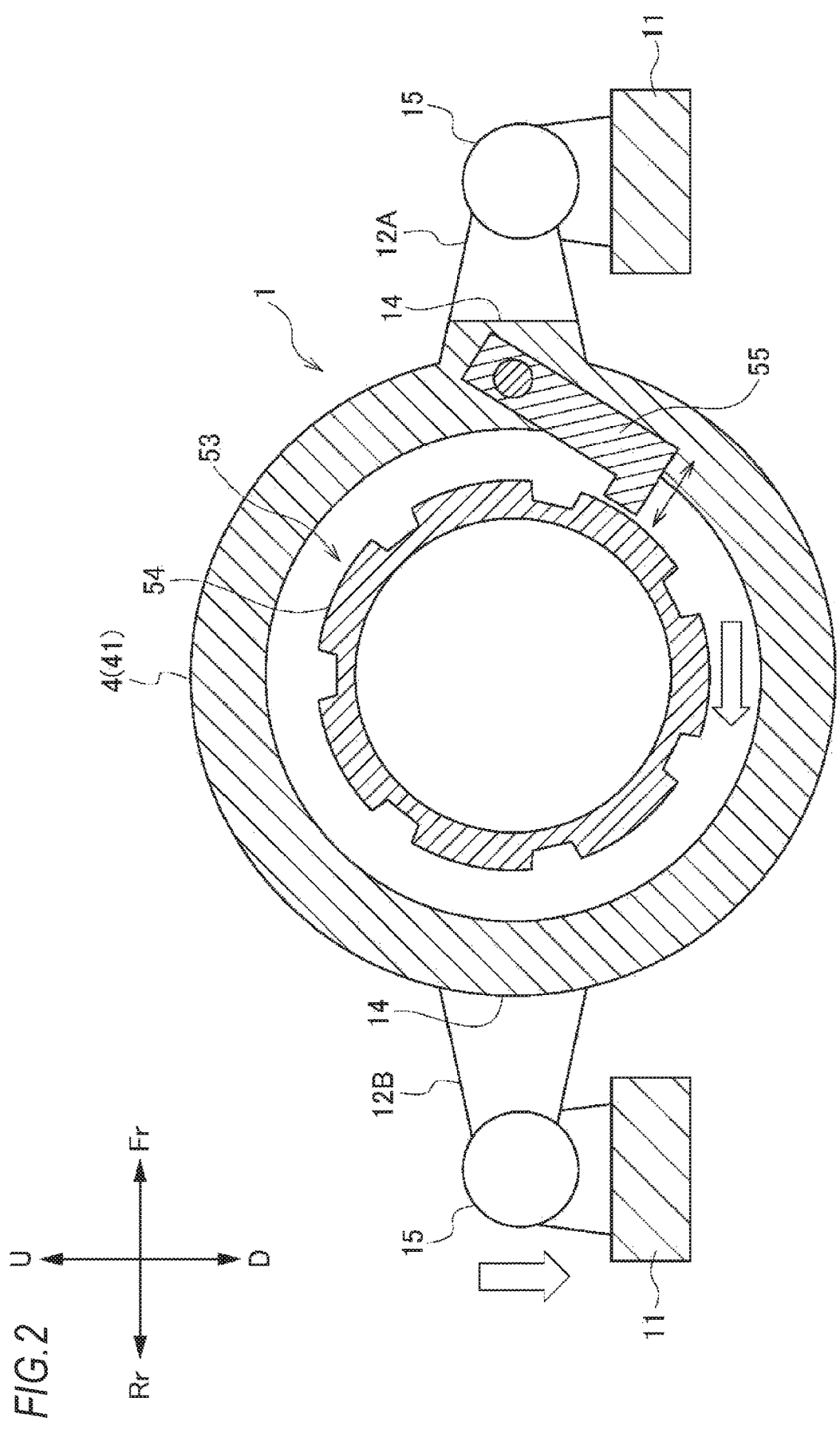
FIG. 2 is a cross-sectional view taken along line A-A in FIG. 1.

As illustrated in FIGS. 1 and 2, the parking brake mechanism 53 is disposed so as to be held between the first planetary mechanism 51 and the second planetary mechanism 52 in the axial direction, and includes a parking gear 54 that is connected to the carrier C2 of the second planetary mechanism 52 and the sun gear S1 of the first planetary mechanism 51 which are coupled to each other and a parking arm 55 that is swingably supported by the housing 4 (main casing 41) and is switched to an operating state or a non-operating state according to the operation of a select lever (shift lever which is not illustrated.

The parking arm 55 is separated from the parking gear 54 in the non-operating state where the select lever is operated other than a parking range to allow rotation of the parking gear 54, and the parking arm 55 meshes with the parking gear 54 in the operating state where the select lever is operated to the parking range to regulate the rotation of the parking gear 54. In a state where the rotation of the parking gear 54 is regulated, since the rotation of the rotating element included in the first planetary mechanism 51 and the second planetary mechanism 52 is also regulated, the electrical motor vehicle 10 is maintained in a stopped state.

Torque Reaction Applied to Housing from Transmission

The housing 4 accommodating the transmission 5 as described above receives a torque reaction from the ring gear R2 of the second planetary mechanism 52 and the ring gear R1 of the first planetary mechanism 51. When an output torque of the electrical motor 2 is t, a deceleration ratio of the second planetary mechanism 52 is a, and a deceleration ratio of the first planetary mechanism 51 is b, a torque reaction T1 applied to the housing 4 from the ring gear R2 of the second planetary mechanism 52 is as follow:

$T1 = a \times t$

A torque reaction T2 applied to the housing 4 from the ring gear R1 of the first planetary mechanism 51 is as follow:

$T2 = a \times b \times t$

Herein, the torque reaction T2 received from the ring gear R1 of the first planetary mechanism 51 is larger than the torque reaction T1 received from the ring gear R2 of the second planetary mechanism 52.

In addition, the left wheel 13L and the right wheel 13R are driven by the electrical motor 2, a total driving torque T generated by the left wheel 13L and the right wheel 13R is equal to the torque reaction T2.

Further, a large load acts on a support portion of the parking arm 55 in the housing 4 at the time of parking.

Differential Device

The differential device 6 includes the differential pinion shaft 61, the differential pinion gear 62, and left and right side gears 63L and 63R so as to allow difference in rotation of the left and right axles 3L and 3R while distributing the driving rotation input from the carrier C1 of the first planetary mechanism 51 to the differential pinion shaft 61 to the left axles 3L and the right axles 3R.

The differential pinion shaft 61 is supported by a differential device casing (not illustrated) so as to be directed in a direction orthogonal to the left and right axles 3L and 3R, and rotatably supports two differential pinion gears 62, which are bevel gears, inside the differential device casing. That is, the differential pinion shaft 61 allows the differential pinion gears 62 to rotate while revolving with the rotation of the differential device casing.

The left and right side gears 63L and 63R are bevel gears, are rotatably supported inside the differential device casing so as to mesh with the differential pinion gears 62 from both sides, and are mechanically connected to the left and right axels 3L and 3R through the connecting unit such as the spline. In a state where the differential pinion gears 62 revolve without rotating, for example, during straight running, the left and right side gears 63L and 63R rotate at a constant speed, and the driving rotation is transmitted to the left and right axles 3L and 3R. Furthermore, during curve running or left or right turning, the differential pinion gears 62 rotate, so that the left and right side gears 63L and 63R rotate relative to each other and the difference in rotation between the left and right axles 3L and 3R is allowed.

Support Structure of Power System

The housing 4 of the power system 1 configured as described above is supported by the frame member 11 of the electrical motor vehicle 10 via the plurality of mount arms 12A, 12B, and 12C. As illustrated in FIGS. 1 and 2, the mount arms 12A and 12B are disposed in a front-rear direction with the power system 1 interposed therebetween, an end of the mount arms on the side of the housing 4 are respectively connected to a front surface and a rear surface of the main casing 41 through fastening members 14, and ends on the side of the frame member 11 are respectively supported by the frame member 11 via mount members 15. The mount arm 12C extends outward from the sidewall portion 42b of the electrical motor cover 42, and is supported by the frame member 11 via a mount member 16. The arrangement of the mount arms 12A and 12B, which are main portions of the present invention, will be described below.

The fastening members 14 between the housing 4 and the mount arms 12A and 12B are disposed so as to overlap in the axial direction with a connecting portion J between the ring gear R1 of the first planetary mechanism 51 and the housing 4. That is, the housing 4 is supported by the frame member 11 of the electrical motor vehicle 10 via the mount arms 12A and 12B in the vicinity of the connecting portion J receiving the large torque reaction T2, whereby the power system 1 can be stably supported.

In addition, the fastening members 14 between the housing 4 and the mount arms 12A and 12B are provided on the main casing 41, which has higher rigidity than the electrical motor cover 42 and the differential device cover 43. Thus, it is possible to stably support the power system 1 while reducing the weight and manufacturing cost of the electrical motor cover 42 and the differential device cover 43.

In addition, the parking brake mechanism 53 supported by the main casing 41 is also disposed in the vicinity of the fastening member 14 (mount arms 12A and 12B), and thus it is possible to stably support the parking arm 55 of the parking brake mechanism 53.

As described above, according to the support structure of the power system 1 of the first embodiment, the fastening members 14 that fastens the housing 4 and the mount arms 12A and 12B are disposed so as to overlap in the axial direction with the connecting portion J that connects the ring gear R1 of the first planetary mechanism 51 and the housing 4. That is, since the housing 4 accommodating the electrical motor 2 and the transmission 5 is supported, in the vicinity of the connecting portion J connecting the housing 4 and the ring gear R1 of the first planetary mechanism 51 that serves as a fixed point of three rotating elements and has the largest torque reaction of the transmission 5, by the frame member 11 of the electrical motor vehicle 10, it is possible to stably support the power system 1 without increasing manufacturing costs in particular.

In addition, the main casing 41 that is an accommodation casing of the transmission 5 including the ring gear R1 of the first planetary mechanism 51 that serves as a fixed point of three rotating elements and has the largest torque reaction of the transmission 5, has high rigidity. Thus it is possible to stably support the power system 1 even when the rigidity of the electrical motor cover 42 accommodating the electrical motor 2 and the differential device cover 43 accommodating the differential device 6 are lowered, and to reduce the weight and manufacturing costs of the power system 1 by the decrease in rigidity of the electrical motor cover 42 and the differential device cover 43.

Since the parking brake mechanism 53 is connected to the carrier C2 of the second planetary mechanism 52 and the sun gear S1 of the first planetary mechanism 51 which are connected to each other, when the electrical motor vehicle 10 is stopped, the rotation of the left and right wheels 13L and 13R can be regulated by the operation of one parking brake mechanism 53 and the electrical motor vehicle 10 can be restrained. Further, since the parking brake mechanism 53 is supported by the main casing 41 having high rigidity and is disposed near the mount arms 12A and 12B, the parking brake mechanism 53 can be stably supported.

Among three rotating elements in each of the first planetary mechanism 51 and the second planetary mechanism 52, the ring gears R1 and R2 located at the outermost peripheral part are supported by the main casing 41 of the housing 4, whereby the transmission 5 can be simplified.

Further, since the rotor shaft 23 of the electrical motor 2 is supported by the housing 4 so as to be relatively rotatable coaxially with one axle (left axle 3L), the size in the radial direction can be made smaller compared with a case where the rotor shaft 23 of the electrical motor 2 and the axle (left axle 3L) are disposed in an offset manner, and the size of the power system 1 can be reduced.

Second Embodiment

A support structure of a power system 1B according to a second embodiment of the present invention will be described below with reference to FIG. 3. However, the same reference numerals as in the above embodiment are used for the configuration common to the above embodiment, and the description of the above embodiment will be cited.

Figure 3:
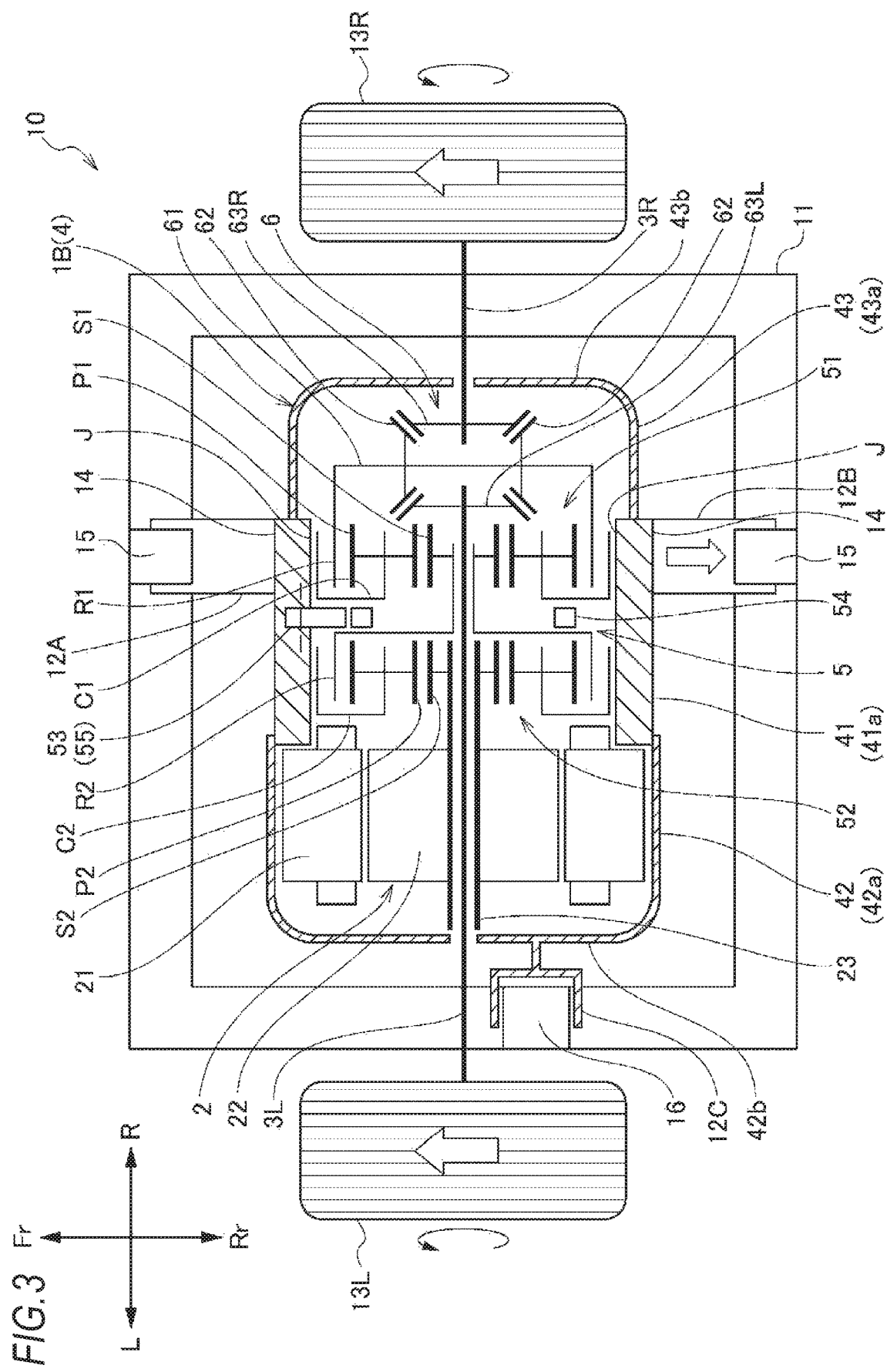
FIG. 3 is a plan view illustrating a support structure of a power system according to a second embodiment of the present invention.

In the power system 1B according to the second embodiment of the present invention, as illustrated in FIG. 3, a sun gear S2 of a second planetary mechanism 52 is connected to an electrical motor 2, a ring gear R2 of the second planetary mechanism 52 is connected to a sun gear S1 of a first planetary mechanism 51, a carrier C2 of the second planetary mechanism 52 is connected (fixed) to a housing 4 in a rotation regulation state, the sun gear S1 of the first planetary mechanism 51 is connected to the ring gear R2 of the second planetary mechanism 52, a ring gear R1 of the first planetary mechanism 51 is connected to a differential device 6, a carrier C1 of the first planetary mechanism 51 is connected (fixed) to the housing in a rotation regulation state, and a parking brake mechanism 53 is connected to the ring gear R2 of the second planetary mechanism 52 and the sun gear S1 of the first planetary mechanism 51 which are connected to each other. According to such a power system 1B, since not only functions similar to those of the power system 1 according to the first embodiment are obtained bus also the carriers C1 and C2 of both the first planetary mechanism 51 and the second planetary mechanism 52 are supported by a main casing 41 of the housing 4, it is possible to make the first planetary mechanism 51 and the second planetary mechanism 52 common.

In the second embodiment, fastening members 14 between the housing 4 of the power system 1B and mount arms 12A and 12B are disposed so as to overlap in an axial direction with a connecting portion J between the carrier C1 of the first planetary mechanism 51 and the housing 4. In this way, the housing 4 is supported by a frame member 11 of an electrical motor vehicle 10 via the mount arms 12A and 12B in the vicinity of the connecting portion J receiving a large torque reaction T2, and thus the power system 1B can be stably supported.

It is noted that the invention is not limited to the above-described embodiment, but can be appropriately modified and improved, and the like.

For example, as long as the housing is supported by the frame member of the vehicle via the mount arms in the vicinity of the rotating element of the planetary mechanism, the housing, and the connecting portion (fixed portion) which receive a large torque reaction, the number and shape of the mount arms can be appropriately set.

In the embodiments described above, the planetary gear mechanism is exemplified as the planetary mechanism, but a planetary roller mechanism using shear resistance of high viscosity of film formed by the rolling motion of the roller may be used instead of the meshing of the gear.

The invention claimed is:

1. A support structure of a power system,
the power system comprising:
an electrical motor that drives a left wheel and a right wheel of a vehicle;
a transmission that is disposed next to the electrical motor in an axial direction on a power transmission path between the electrical motor and the left and right wheels;
a housing that accommodates the electrical motor and the transmission;
a first mount arm; and
a second mount arm provided on an axial end of a drivetrain, wherein
the housing is supported by a frame member of the vehicle via the first and the second mount arms,
the transmission includes a first planetary mechanism having first to third rotating elements,
the electrical motor is connected to the first rotating element of the first planetary mechanism,
the left and right wheels are operably connected to the second rotating element of the first planetary mechanism,
the housing is connected to the third rotating element of the first planetary mechanism, and
a fastening member that fastens the housing and the first mount arm is disposed so as to overlap in the axial direction with a connecting portion that connects the third rotating element of the first planetary mechanism and the housing.

2. The support structure of the power system according to claim 1, wherein
the housing includes: a main casing that accommodates the transmission; and an electrical motor cover that accommodates the electrical motor, and
the main casing has higher rigidity than the electrical motor cover.

3. The support structure of the power system according to claim 2, wherein
the power system further includes a differential device that is disposed coaxially on a side opposite to the electrical motor with the transmission interposed therebetween, the differential device being connected to the second rotating element of the first planetary mechanism and distributing output rotation decelerated by the transmission to the left and right wheels,
the housing includes: the main casing that accommodates the transmission; the electrical motor cover that accommodates the electrical motor; and a differential device cover that accommodates the differential device, and
the main casing has higher rigidity than the electrical motor cover and the differential device cover.

4. The support structure of the power system according to claim 3, wherein
the transmission further includes
a second planetary mechanism including first to third rotating elements coaxially with the first planetary mechanism, and
a rotation regulating mechanism that is switchable between an operating state and a non-operating state, the rotation regulating mechanism regulating a rotation of a rotating element in the operating state and allowing the rotation of the rotating element in the non-operating state,
the electrical motor is connected to the first rotating element of the second planetary mechanism,
the first rotating element of the first planetary mechanism is connected to the second rotating element of the second planetary mechanism,
the main casing of the housing is connected to the third rotating element of the second planetary mechanism,
the differential device is connected to the second rotating element of the first planetary mechanism,
the main casing of the housing is connected to the third rotating element of the first planetary mechanism,
the rotation regulating mechanism is connected to the second rotating element of the second planetary mechanism and the first rotating element of the first planetary mechanism which are connected to each other, and
the rotation regulating mechanism is supported by the main casing of the housing.

5. The support structure of the power system according to claim 4, wherein
the first rotating element of the second planetary mechanism is a sun rotating body,
the second rotating element of the second planetary mechanism is a carrier rotating body,
the third rotating element of the second planetary mechanism is a ring rotating body,
the first rotating element of the first planetary mechanism is a sun rotating body,
the second rotating element of the first planetary mechanism is a carrier rotating body, and
the third rotating element of the first planetary mechanism is a ring rotating body.

6. The support structure of the power system according to claim 4, wherein
the first rotating element of the second planetary mechanism is a sun rotating body,
the second rotating element of the second planetary mechanism is a ring rotating body,
the third rotating element of the second planetary mechanism is a carrier rotating body,
the first rotating element of the first planetary mechanism is a sun rotating body,
the second rotating element of the first planetary mechanism is a ring rotating body, and
the third rotating element of the first planetary mechanism is a carrier rotating body.

7. The support structure of the power system according to claim 4, wherein
the electrical motor includes: a stator that is supported by the housing; and a rotor that is disposed rotatably on an inner peripheral side of the stator,
a rotor shaft is coupled to an inner peripheral part of the rotor to surround an outer periphery of one axle, the rotor shaft being connected to the first rotating element of the second planetary mechanism, and
the rotor shaft is supported by the housing coaxially with the one axle and relatively rotatable to the one axle.

* * * * *